United States Patent
Van Asten et al.

(10) Patent No.: US 7,352,766 B2
(45) Date of Patent: *Apr. 1, 2008

(54) HIGH-SPEED MEMORY HAVING A MODULAR STRUCTURE

(75) Inventors: Kizito Gysbertus Antonius Van Asten, Ottawa (CA); Faisal Dada, Ottawa (CA); Edward Aung Kyi Maung, Ottawa (CA)

(73) Assignee: Alcatel Lucent, Paris (FR)

(*) Notice: Subject to any disclaimer, the term of this patent is extended or adjusted under 35 U.S.C. 154(b) by 1148 days.

This patent is subject to a terminal disclaimer.

(21) Appl. No.: 10/247,568

(22) Filed: Sep. 20, 2002

(65) Prior Publication Data

US 2003/0174708 A1 Sep. 18, 2003

Related U.S. Application Data

(63) Continuation-in-part of application No. 10/194,277, filed on Jul. 15, 2002, now Pat. No. 7,126,959.

(60) Provisional application No. 60/363,248, filed on Mar. 12, 2002.

(51) Int. Cl.
H04L 12/54 (2006.01)
G06F 12/00 (2006.01)
G06F 13/00 (2006.01)

(52) U.S. Cl. .................. 370/429; 370/369; 711/1; 711/101

(58) Field of Classification Search .......... None
See application file for complete search history.

(56) References Cited

U.S. PATENT DOCUMENTS

| | | | |
|---|---|---|---|
| 5,187,780 A | 2/1993 | Clark et al. | |
| 5,905,725 A * | 5/1999 | Sindhu et al. | 370/389 |
| 6,160,814 A | 12/2000 | Ren et al. | |
| 6,314,489 B1 | 11/2001 | Nichols et al. | |
| 6,356,546 B1 * | 3/2002 | Beshai | 370/358 |
| 6,493,347 B2 * | 12/2002 | Sindhu et al. | 370/401 |

(Continued)

OTHER PUBLICATIONS

Iyer, S., et al, "Techniques for Fast Shared Memory Switches", Unpublished Manuscript, Stanford University, Sep. 2001.

(Continued)

*Primary Examiner*—Huy D. Vu
*Assistant Examiner*—Clemence Han
(74) *Attorney, Agent, or Firm*—Victoria Donnelly

(57) ABSTRACT

A high-speed memory is provided, the memory having a write port and a read port and comprised of the following: a plurality of N memory modules for storing fixed size cells, which are segments of a variable size packet divided into X cells, the X cells being grouped into [X/N] groups of cells; a read-write control block receiving cells from the write port and storing each cell, which belongs to the same group, in a selected different one of the N memory modules at the same memory address (the group address); a multi-cell pointer (MCP) storage for storing an MCP for the group of cells (an associated MCP) at an MCP address, the MCP having N memory module identifiers to record the order in which cells of the group of cells are stored in the N memory modules; the MCP address being the same as the group address.

49 Claims, 11 Drawing Sheets

U.S. PATENT DOCUMENTS

| | | | |
|---|---|---|---|
| 6,826,669 B1* | 11/2004 | Le et al. | 711/173 |
| 7,185,179 B1* | 2/2007 | Furusho | 712/214 |
| 2002/0163922 A1* | 11/2002 | Dooley et al. | 370/412 |
| 2002/0186705 A1* | 12/2002 | Kadambi et al. | 370/452 |
| 2003/0108056 A1* | 6/2003 | Sindhu et al. | 370/401 |

OTHER PUBLICATIONS

Kumar, S., et al, Implementing Parallel Packet Buffering, Part I (CommsDesign, Apr. 22, 2002).

Kumar, S., et al, Implementing Parallel Packet Buffering, Part II (CommsDesign, Apr. 29, 2002).

* cited by examiner

HIGH-SPEED MEMORY HAVING A MODULAR STRUCTURE

RELATED APPLICATIONS

This application claims priority from U.S. Provisional Patent Application Ser. No. 60/363,248 filed on Mar. 12, 2002 (VAN ASTEN, et al), and from U.S. patent application Ser. No. 10/194,277 filed on Jul. 15, 2002 now U.S. Pat. No. 7,126,959 (VAN ASTEN, et al).

FIELD OF THE INVENTION

The invention relates to semiconductor memory and, in particular, to a high-speed memory having a modular structure.

BACKGROUND OF THE INVENTION

A typical system architecture suitable for a small packet switch is illustrated in FIG. 1. The small packet switch 10 comprises several port cards 12 labeled port card #1 to port card #P, a packet bus 14, and a packet memory 16. The port cards each comprise a line interface 18, an ingress packet processor 20, and an egress packet processor 22. The small packet switch may contain other elements, such as a controller, not shown in FIG. 1.

In operation, packets arriving through the line interface 18 on the port card 12 are processed by the ingress packet processor 20, and sent through the packet bus 14, for temporary storage in queues in the packet memory 16. The packet memory queues are typically organized according to the destination of the packets, in this case port card 12. Once packets are available in the packet memory queues, they are transmitted from the packet memory 16 through the packet bus 14 to the destination port cards 12, for further processing in the egress packet processor 22 of the respective port card 12. The processed egress packets are then sent out through the line interface 18.

The purpose of the packet memory 16 is to buffer the packets temporarily when more packets arrive for a specific destination port card 12 than the port card 12 can accept.

Switch capacity may be defined as the sum of the bit rates of all line interfaces.

The type of small packet switch 10 illustrated in FIG. 1 is limited in capacity by the throughput of the packet bus and the access bandwidth of the single shared packet memory.

Another system architecture, also common in the prior art, is a large packet switch illustrated in FIG. 2. The large packet switch 30 comprises several port cards 32 and a switch fabric 34. The port cards 32 in the large packet switch 30 differ in a number of details from the port cards 12 of the small packet switch 10. The port card 32 comprises a fabric interface 36, a packet memory 38, a line interface 40, and ingress and egress packet processors 42 and 44 respectively.

In the large packet switch 30, there is no single shared packet memory (as in the small packet switch 10); rather, each port card 32 contains a separate packet memory 38. Packets arriving through the line interface 40 and the ingress packet processor 42 are sent through the fabric interface 36 to the switch fabric 34. The switch fabric 34 routes each packet to the destination port card 32, where the packets accumulate in queues of the packet memory 38. Packets are then removed from the packet memory 38 by the egress packet processor 44 and sent out through the line interface 40.

In the large packet switch 30, the bandwidth available through the switch fabric 34 is usually greater than the bandwidth of the line interface 40 in the port card 32, in order to accommodate the fluctuating packet traffic without the loss of packets. The packet memory 38 buffers and absorbs the statistical fluctuations in the amount of traffic arriving for the destination port card 32 from the switch fabric 34.

In a similar large switch architecture of the prior art, an ingress buffer 46 (shown in dotted lines in FIG. 2) is attached to the ingress packet processor. The ingress buffer 46 may be required if the bandwidth available through the switch fabric 34 is lower than the peak bandwidth from the line interface 40. The ingress buffer 46 is another form of packet memory.

The capacity of the large packet switch 30 is a function of the number of port cards 32 that can be supported by the switch fabric 34, and the capacity of each individual port card 32. The capacity of a port card 32 is largely determined by the bandwidth of the line interface 40. In a high capacity system, fibre optic line interfaces with a bit rate of 10 Gigabits per second are common at present. It is also possible to combine multiple fibre optic line interfaces on a single port card, to achieve even higher capacity.

While the bit rates available in fibre optic line interfaces have increased significantly in recent years, the speed available in the semiconductor technology used in the construction of packet memories has not progressed at the same rate. Consequently, architectural innovations are required to permit the construction of high capacity packet switches that contain packet memories.

An early innovation has been to use fixed size packets (cells). Variable size packets are segmented by the ingress packet processor (20 and 42) into fixed size cells before switching, and are reassembled into their original format by the egress packet processor (22 and 44). This innovation has allowed packet memories (16 and 38) to be based on a very wide bus, possibly as wide as the cell size. Recall that the overall access bandwidth of a memory is a function of the read/write speed and of the width of the memory bus. A typical switch cell size in the industry is 64 octets, resulting in a possible 512-bit wide memory bus.

A second consideration is the amount of memory required to implement a packet memory. As the capacity in terms of speed is increased, the amount of data (number of cells or packets) to be stored also increases. Very high-speed memory devices, for example static random access memory (SRAM), generally have lower storage capacity than slower devices, for example various forms of dynamic random access memory (DRAM). DRAM devices are common in the computer industry, and are obtainable at a much lower price per bit than the higher speed SRAM devices.

The problems due to the limitations of semiconductor memories have been recognized in recent years, and a number of solutions have been proposed which are based on the concept of dividing the packet memory into several banks, to achieve even greater parallelism than is available by merely using a wider bus.

U.S. Pat. No. 5,187,780 (Clark, et al.) describes a basic packet memory. The memory is divided into two zones to allow for simultaneous reading and writing in the same transfer cycle.

In the packet switch described in U.S. Pat. No. 6,160,814 (Ren, et al.) a multi-bank memory is used for a shared packet memory. During the storage process, cells are assigned to different memory modules in a cyclic assignment algorithm.

The packet switch described in U.S. Pat. No. 6,160,814 is similar to the small packet switch 10 described in FIG. 1 above.

U.S. Pat. No. 6,314,489 (Nichols, et al.) describes a data cell storage system with a plurality of memory units for storing data cells (ATM cells) and a control memory for keeping track of the storage location of each cell.

The paper "Techniques for Fast Shared Memory Switches" by Sundar Iyer and Nick McKeown of Stanford University, unpublished manuscript, September 2001, available at http://klamath.stanford.edu/~sundaes/Papers/Unpub/sharedmemv1.0.pdf at the Stanford University website at http://www.stanford.edu, offers a solution for a multi-bank packet buffer with FIFO (first-in, first-out) behavior. This paper describes an algorithm, which takes into account the row/column addressing peculiarities of DRAMs.

Two recent papers by Sailesh Kumar et al., "Implementing Parallel Packet Buffering, Parts I and II" (CommsDesign, Apr. 22 and Apr. 29, 2002, respectively, available at http://www.commsdesign.com/story/OEG20020422S0006 and http://www.commsdesign.com/story/OEG20020429S0008) contain a good academic discussion of the issue. These papers propose a Parallel Packet Buffering (PPB) algorithm in which the selection of the write destination buffer is explicitly based on "least occupancy". Unfortunately, the algorithm has a finite probability of packet loss.

While a number of approaches have been proposed in the prior art for enhancing the capacity and speed of packet or cell storage memory, the need still exists for further development and alternative design of high-speed memory which would improve the memory performance and reduce the costs, while providing additional useful features.

SUMMARY OF THE INVENTION

It is an objective of the present invention to develop a high-speed memory, which would provide improved performance and reduced costs.

According to one aspect of the invention there is provided a high-speed memory having a write port and a read port, comprising:

a plurality of N memory modules for storing fixed size cells which are grouped into one or more groups of cells destined for the same read port, each group including up to N cells;

a read-write control block for receiving cells from the write port and storing each cell, which belongs to the same group, in a selected different one of the N memory modules at a memory address, the memory address being selected from a sub-set of N memory addresses, the addresses in the sub-set being related among the N memory modules according to a first relationship, and for retrieving each of said cells from the memory modules and sending said cells to the read port;

a multi-cell pointer (MCP) storage for storing an MCP for each group of cells (the associated MCP), each MCP having N memory module identifiers to record the order in which said cells of said each group are stored in each of the selected different ones of the N memory modules; and the MCP being stored in the MCP storage at an MCP address, which is related to one of the memory, addresses in the sub-set of N memory addresses according to a second relationship.

In the high-speed memory of the embodiment of the invention, cells are segments of a variable size packet divided into X cells, the packet including [X/N] groups of cells. Beneficially, these cells are assigned to the [X/N] groups of cells sequentially.

In the segmentation of variable size packets, the case may frequently arise wherein X=1 (single cell packet) and N>1, and where it is convenient that the group includes one or more single cell packets, especially in cases when the group includes more than one single cell packet includes packets arriving at the write port within a predetermined (short) time interval.

Conveniently, the first relationship is such that each memory address in the sub-set of N memory addresses is the same, and the second relationship is such that the MCP address is the same as each of the memory addresses in the sub-set of N memory addresses.

Advantageously, the high-speed memory includes a memory interface between the read-write control block and the plurality of N memory modules.

The number of memory modules in the plurality of N memory modules may vary depending on the application and is equal to N=5 in the embodiment of the invention. The variable size packet may be divided into different number X of cells depending on the cell size, conveniently X ranging from X=1 to about 200.

The read-write control block of the high-speed memory comprises means for retrieving each of said cells from said group of cells from the memory modules and sending said cells to the read port when all cells of the variable size packet have been stored. The read-write control block further comprises an MCP storage access logic block for retrieving and storing MCPs, and a memory module access logic block for providing read and write access to the N memory modules. Conveniently, the means for retrieving cells from the memory modules includes a means for receiving read commands from the read port, and a read queue means for queueing the retrieved cells. The means for retrieving further comprises of a scheduler for retrieving the cells from a plurality of the read queue means and sending the cells to the read port. Beneficially, the means for receiving and storing comprises a means for reading cell information and a write queue means for queueing the cells to be stored in the memory modules. The means for retrieving provides retrieval of said cells of said group of cells from the N memory modules in the order recorded by the associated MCP.

Advantageously, the high-speed memory described above is used in combination with a packet processor for processing variable size packets buffered in the high-speed memory.

Conveniently, the read write control block further comprises means for monitoring the number of cells presently stored in the plurality of N memory modules and for generating a backpressure control signal when the number of cells exceeds a threshold, and the MCP storage access logic comprises means for selecting one of the N memory modules for storing a cell arriving at the write port.

Advantageously, the high-speed memory of the embodiment of the invention may be used in a packet switch, comprising a plurality of port interfaces associated with packet processing means and connected to the high-speed memory.

Another packet switch may comprise a plurality of port modules, each comprising a packet processing means and a packet memory, the packet memory being the high-speed memory as described above, the plurality of port modules being interconnected, e.g. through a switch fabric. Conveniently, each of the plurality of port modules comprises multiple ports to provide a mesh interconnection between the port modules.

According to another aspect of the invention, there is provided a high-speed memory having a write port and a read port, comprising:

a plurality of N memory modules for storing fixed size cells, which are segments of a variable size packet divided into X cells, the X cells being grouped into $\lceil X/N \rceil$ groups of cells;

a read-write control block comprising means for receiving cells from the write port and storing each cell, which belongs to the same group, in a selected different one of the N memory modules at the same memory address (the group address);

a multi-cell pointer (MCP) storage for storing an MCP for said group of cells (the associated MCP) at an MCP address, the MCP having N memory module identifiers to record the order in which cells of said group of cells are stored in the N memory modules; and the MCP address being the same as the group address.

Conveniently, the cells from the variable size packet are assigned to the $\lceil X/N \rceil$ groups of cells sequentially. The read-write control block comprises means for retrieving each of said cells from said group of cells from the memory modules and sending said cells to the read port when all cells of the variable size packet have been stored. The read-write control block further comprises an MCP storage access logic block for retrieving and storing MCPs, and a memory module access logic block for providing read and write access to the N memory modules. The means for retrieving cells includes a means for receiving read commands from the read port, and a read queue means for queueing the retrieved cells. The means for retrieving further comprises a scheduler for retrieving the cells from a plurality of the read queue means and sending the cells to the read port. The means for receiving and storing comprises means for reading cell information, and write queue means for queueing the cells to be stored in the memory modules. The means for retrieving provides retrieval of said cells of said group of cells from the N memory modules in the order recorded by the associated MCP.

Beneficially, the read-write control block further comprises means for monitoring the number of cells presently stored in the plurality of N memory modules and for generating a backpressure control signal when the number of cells exceeds a threshold, and the MCP storage access logic comprises means for selecting one of the N memory modules for storing a cell arriving at the write port.

Beneficially, the high-speed memory is used in combination with a packet processor for processing variable size packets buffered in the high-speed memory.

One of the applications of the high-speed memory of the embodiment of the invention is to use such memory in a packet switch, comprising a plurality of port interfaces associated with packet processing means and connected to the packet memory.

A packet switch may be comprised of a plurality of port modules, each comprising a packet processing means and a packet memory, the packet memory being the high-speed packet memory as described above, the plurality of port modules being interconnected, e.g. through a switch fabric. Conveniently, each of the plurality of port modules comprises multiple ports to provide a mesh interconnection between the port modules.

According to another aspect of the invention there is provided a method for storing a cell in the high-speed memory as described above, comprising the steps of:

(a) if the cell is the first cell in a group of cells:
obtaining an unused group address;
creating the associated MCP;
storing the cell in one of the N memory modules at the group address;
storing the memory module identifier of said one of the N memory modules in the MCP; and
storing the associated MCP in the MCP storage;

(b) if the cell is not the first cell in the group of cells:
retrieving the associated MCP from the MCP storage;
storing the cell in another one of the N memory modules at the group address;
storing the memory module identifier of said one of the N memory modules in the MCP; and
storing the associated MCP in the MCP storage.

According to yet another aspect of the invention there is provided a method for storing and retrieving a variable size packet in a memory having N memory modules, comprising the steps of:

(a) dividing the variable size packet into X fixed size cells;
(b) grouping the X cells into $\lceil X/N \rceil$ groups of cells;
(c) storing each cell, which belongs to the same group of cells, in a selected different one of the N memory modules at the same memory address (the group address);
(d) creating a multi-cell pointer (MCP) having N memory module identifiers, the N memory module identifiers being recorded in the order in which the cells of the same group are stored in the N memory modules;
(e) storing the MCP in an MCP storage at an MCP address, the MCP address being the same as the group address; and
(f) repeating the steps (c) to (e), if required.

According to one more aspect of the invention, there is provided a method for storing and retrieving a sequence of single cell packets in a memory having N memory modules, comprising the steps of:

accumulating single cell packets having the same destination identifiers into groups of up to N cells;
storing each cell, which belongs to the same group of cells, in a selected different one of the N memory modules at the same memory address (the group address);
creating a multi-cell pointer (MCP) having N memory module identifiers, the N memory module identifiers being recorded in the order in which the cells of the same group are stored in the N memory modules;
storing the MCP in an MCP storage at an MCP address, the MCP address being the same as the group address; and
repeating these steps if required.

The method may further comprise the step of retrieving the cells representing the variable size packet when all cells of the variable size packet have been stored. Conveniently, the step of retrieving may further comprise the following:

(g) retrieving the MCP at the MCP address of the associated group of cells;
(h) retrieving a cell at the group address from the memory module indicated by the memory module identifier of the MCP;
(i) sending the cell to a read queue to be forwarded to the read port; and
(j) repeating the steps (g) to (i) until all cells of the variable size packet have been retrieved.

Conveniently, the step (c) may further comprise the steps of selecting the one of the N memory modules by taking into account: the number of cells already stored in each of the N available memory modules and the memory module identifier of the memory module most recently used for storing a cell.

The high-speed memory of the embodiment of the invention has the following advantages. It recognizes the segmentation of packets, and facilitates the reassembly of same, provides switching behavior (selective read) rather than FIFO behaviour, reduces the amount of high-speed pointer memory required to keep track of cell storage locations, takes advantage of available flow control mechanisms in the system to avoid packet loss, provides a high efficiency of memory usage to reduce the number of devices needed, and thus avoiding many drawbacks of the prior art solutions.

A further improvement in the efficiency of memory usage is obtained by grouping up to N single cell packets that arrive within a short time and have the same destination identifier, and storing them as if they where cells resulting from the segmentation of a single longer variable size packet.

BRIEF DESCRIPTION OF THE DRAWINGS

The invention will now be described in greater detail with reference to the attached drawings, in which.

DETAILED DESCRIPTION OF THE PREFERRED EMBODIMENTS

The description is in three major parts, first, a brief explanation of a large switch design which incorporates a novel high-speed memory; secondly, a detailed description of the design of the high-speed memory; and thirdly, a description of the method used to select memory modules within the high-speed memory and how it provides storage of cells and variable size packets.

High-speed Memory Application

Figure 1:
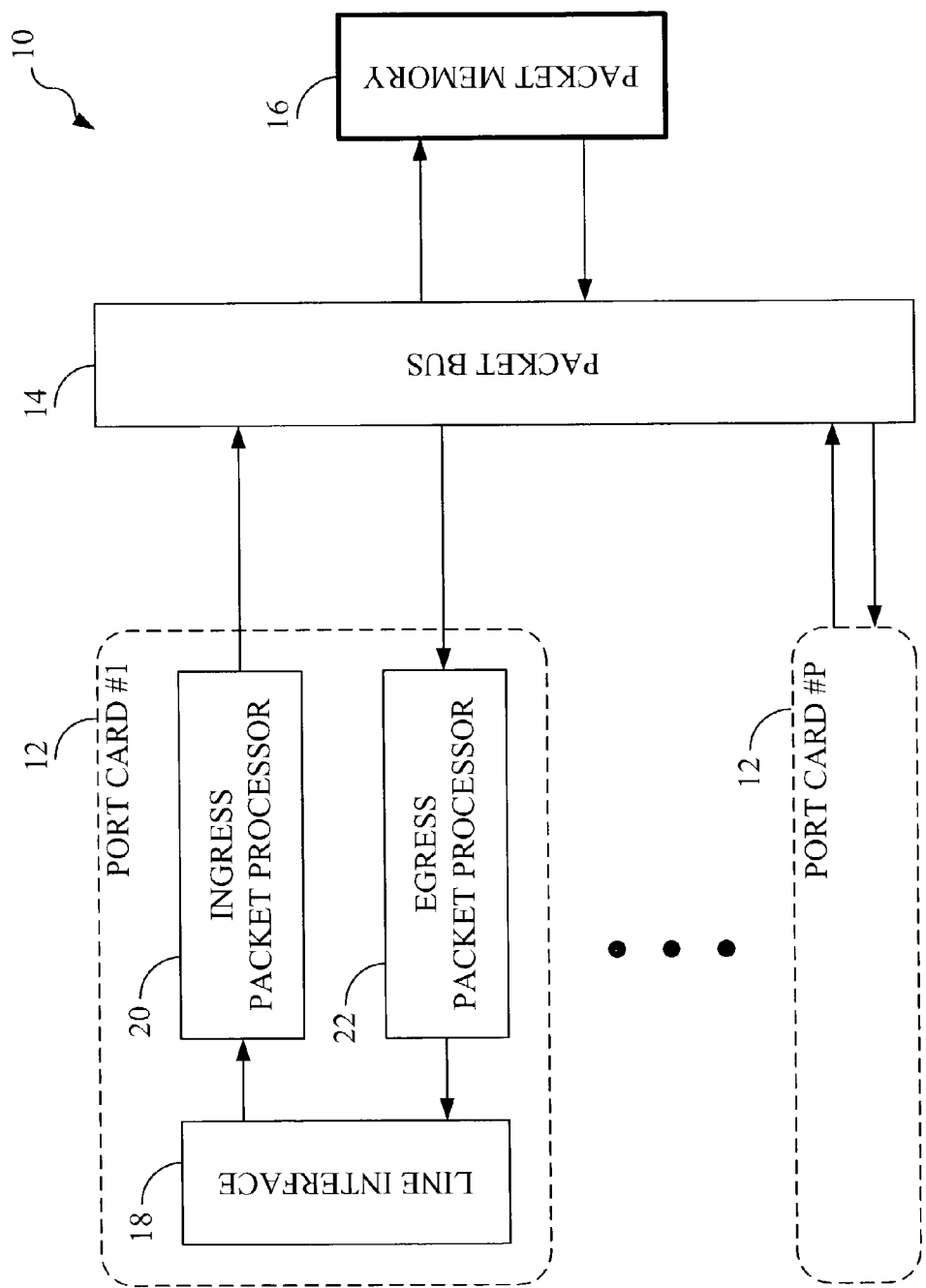
FIG. 1 is an illustration of a small packet switch of the prior art.
Figure 2:
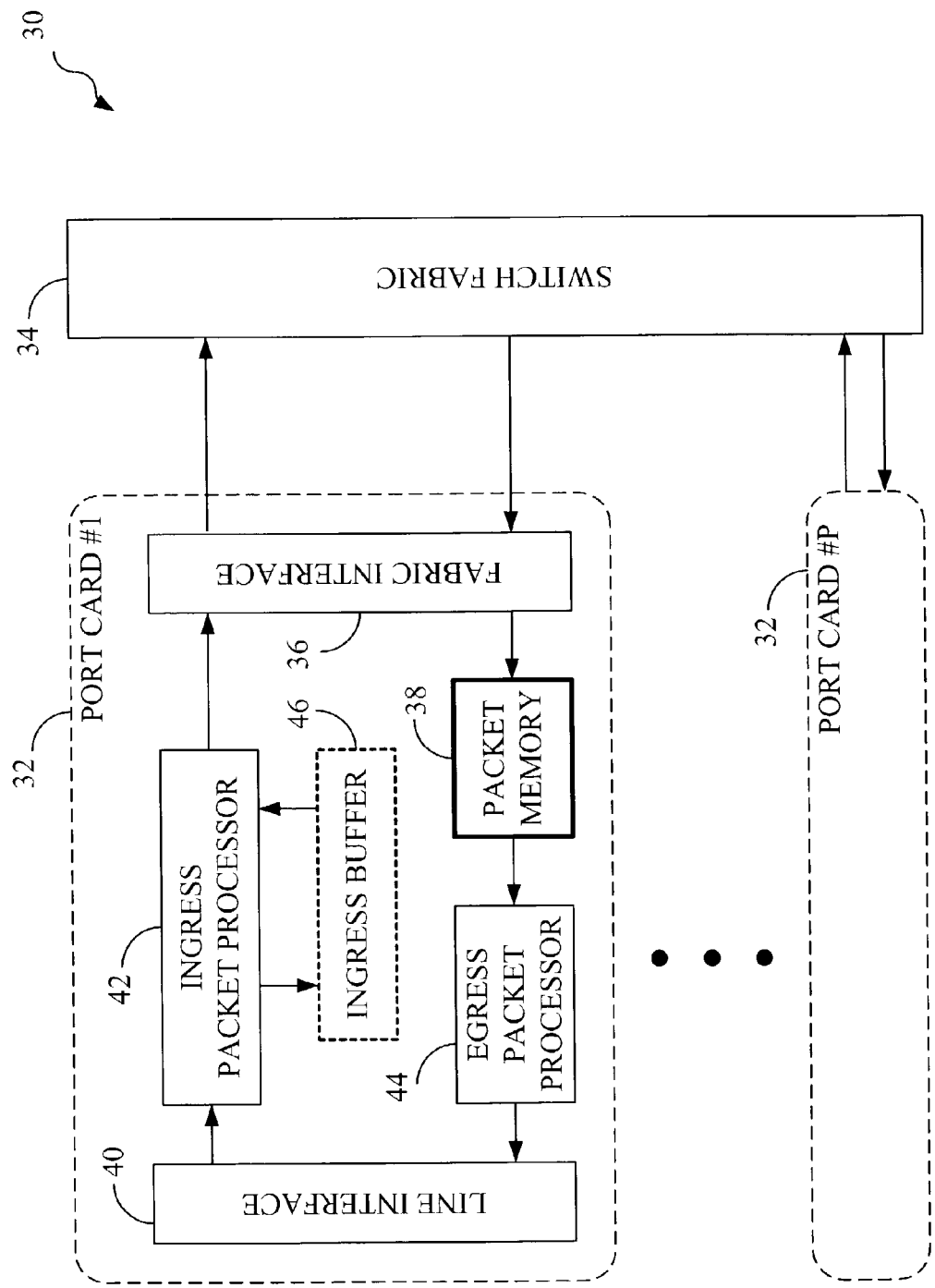
FIG. 2 is an illustration of a large packet switch of the prior art.
Figure 3:
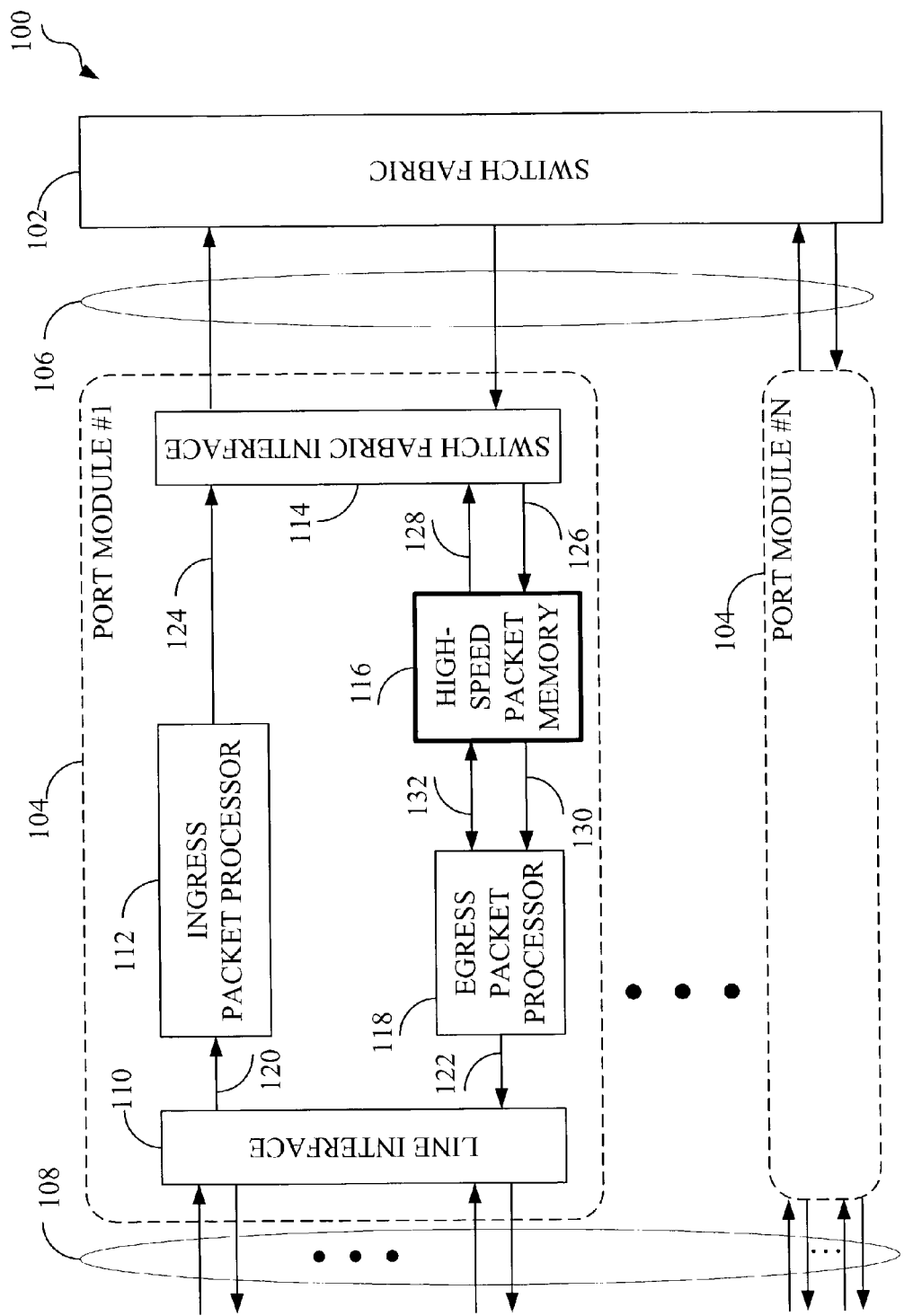
FIG. 3 is an illustration of a large packet switch utilizing a high-speed memory of an embodiment of the invention.

FIG. 3 illustrates a packet switch 100 of an embodiment of the invention, showing an application of a high-speed memory of the invention in heavy outline.

The packet switch 100 comprises a switch fabric 102 and a plurality P of port modules 104, labeled port module #1 to port module #P. Not shown are other necessary components of a packet switch, such as control processors, as they are not relevant to the present invention.

The port modules 104 are connected to the switch fabric 102 over bi-directional high-speed links 106. External traffic, in the form of data packets, arrives and leaves at each port module 104 over the external links 108.

The purpose of the packet switch 100 is to switch packets arriving at any of its external links 108 to output links 108, in the manner of conventional packet switches.

The port module 104 comprises a number of blocks: a line interface 110; an ingress packet processor 112; a switch fabric interface 114, a high-speed memory 116, and an egress packet processor 118.

The line interface 110 transmits incoming packet data over a packet data link 120 to the ingress packet processor 112, and receives outgoing packet data from the egress packet processor 118 over a packet data link 122.

The processed incoming traffic is sent from the ingress packet processor 112 over a cell data link 124 to the switch fabric interface 114, which is connected to the switch fabric 102 over the bi-directional high-speed links 106.

Outgoing traffic from the switch fabric 102 arrives at the switch fabric interface 114 of a port module 104 over the bi-directional high-speed links 106. The switch fabric interface 114 is connected to the high-speed memory 116 over a cell data link 126 and a back pressure link 128. The high-speed memory 116 is further connected to the egress packet processor 118 over a cell data link 130 and a bi-directional control link 132.

The line interface 110 comprises the function of extracting packets from the received external links 108, for example fibre links in SONET (Synchronous Optical Network) format, and sending the packets to the ingress packet processor 112. The line interface 110 also comprises the function of formatting and inserting the packets received from the egress packet processor 118 to the outgoing external links.

The ingress and egress packet processors (112 and 118) perform functions commonly associated with packet switching. One of these functions is the segmentation and reassembly of variable size packets such as IP (internet protocol) data packets.

Each variable size packet received by the ingress packet processor 112 is converted (segmented) into one or more fixed size packets, also known as cells or switch cells. A switch cell contains a payload of data from the original packet and a header to steer it through the switch fabric. A switch cell that is the result of the segmentation of a short variable size packet into a single cell is also referred to as a single cell packet.

Figure 4:
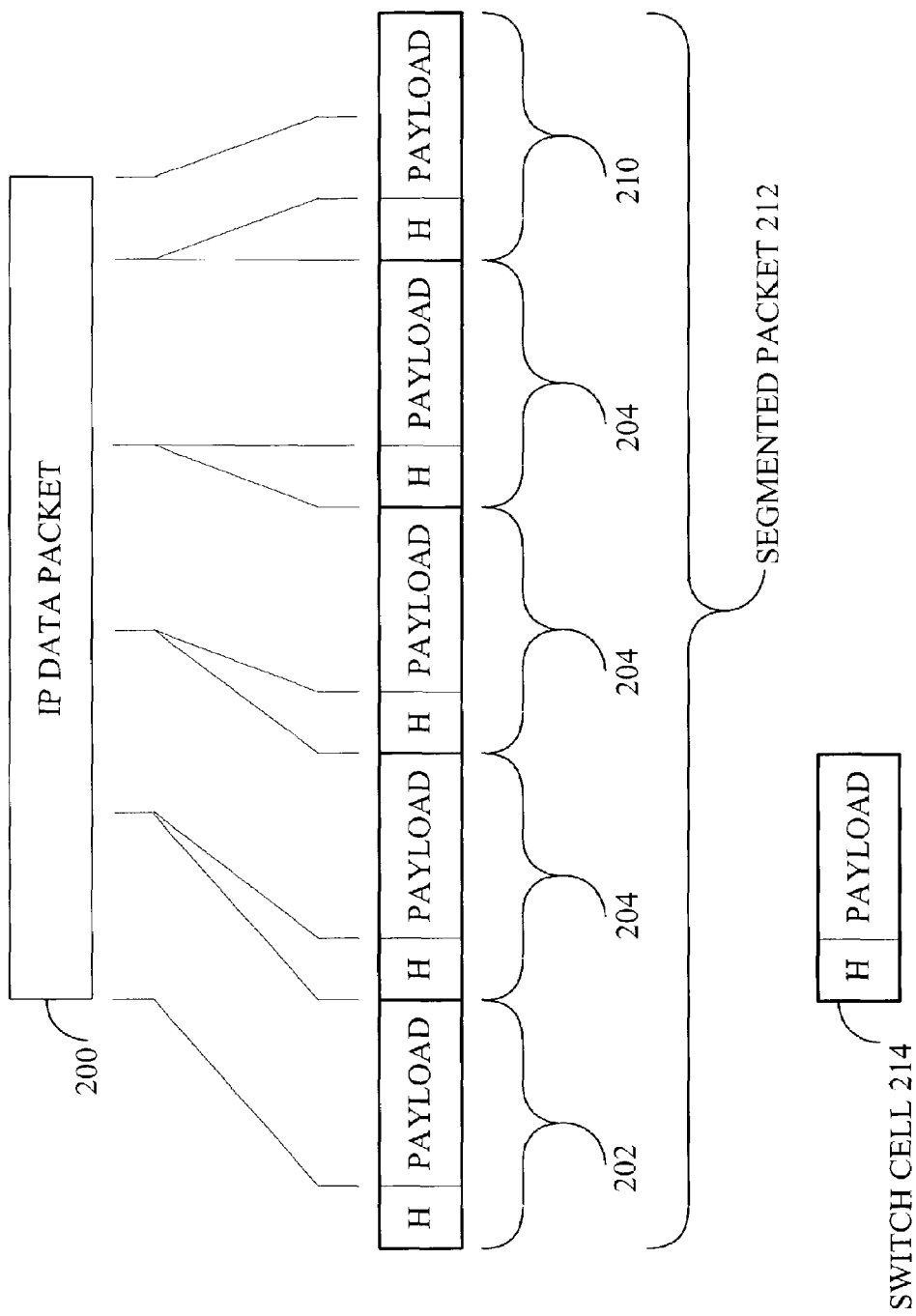
FIG. 4 is an illustration of the segmentation of a typical IP data packet into switch cells.

FIG. 4 illustrates the segmentation of a typical IP data packet 200 into a segmented packet of five switch cells 202, 204 (three times), and 210. Each switch cell comprises a header field "H" and a payload field. The contents of the IP data packet 200 are copied into the payload of the five switch cells 202 to 210. The first switch cell 202 is also called a head cell, switch cells 204 are also called a neck cells, and the last switch cell 210 is also called a tail cell. All three types of switch cell share the format of a common general switch cell 214.

The header of each switch cell (214) contains a marker indicating whether a cell is a head cell, a neck cell, or a tail cell. A very short data packet may be segmented into a single switch cell (a single cell packet), which is then marked as both a head cell and a tail cell. The header of a tail cell further contains an indication of the number of valid payload bytes.

The headers of all switch cells 214 contain additional fields specific to the nature of the switch fabric 102 to allow the switch cell to be steered through the switch fabric 102, and system related information, such as a packet context which may be used by the ingress and egress packet processors 112 and 118 for their operation.

The segmented packet 212 is switched through the switch fabric 102 in sequence and will be received by a high-speed memory 116 on a port module 104.

Each switch cell of every segmented packet 212, sent from the ingress packet processors of a number of port modules 104, is switched independently by the switch fabric. As a result, switch cells 214 of different segmented packets 212 may arrive at a destination port module 104 interleaved in a random manner. However, the switch cells 214 of a given segmented packet 212 will arrive from the switch fabric 102 in the same order in which they were sent into the switch fabric 102, namely head cell 202 first, followed by zero or more neck cells 204, followed by a tail cell 210 (except in the case of a single cell packet which consists of only a single switch cell 214 as described earlier).

A purpose of the high-speed memory 116 is to buffer the switch cells belonging to each segmented packet 212, at least until the tail cell 210 of a segmented packet 212 is received. Although the high-speed memory 116 is designed to buffer all arriving switch cells 214, it is possible under abnormal conditions that there is no space available.

It is also a function of the high-speed memory 116 to protect the system against packet loss by sending a feedback signal on the back pressure link 128 to the switch fabric 102 in the event that storage space is running out.

It is another purpose of the high-speed memory 116 to inform the egress packet processor 118 over the bi-directional control link 132 that a complete segmented packet 212 is in the buffer.

It is yet another purpose of the high-speed memory 116 to then send the switch cells making up the complete segmented packet 212 to the egress packet processor 118 over the cell data link 130, under the control of the bidirectional control link 132.

Although the complete segmented packet 212 is available at the same time, more than one such segmented packet 212 may be available, and it is a function of the egress packet processor 118 to determine which switch cell 214 (in order of sequence) of the more than one segmented packet 212 should be sent first. This determination may be based on packet priority or other considerations within the scope of the egress packet processor 118.

It may be recalled that a segmented packet 212 represents an original variable length data packet, for example an IP data packet 200. While it is a function of the high-speed memory 116 to buffer the segmented packet 212, it is a function of the egress packet processor 118 to reassemble the payloads of the cells back into the original data packet, in effect reversing the process illustrated in FIG. 4.

Another function of the egress packet processor 118 is to process the reassembled packet further and send it over the packet data link 122 to the line interface 110, for transmission in the appropriate format over an outgoing external link 108.

The description of the embodiment of a system that makes use of the high-speed memory of the invention, includes a number of design features, which are common in the prior art, for example the concept of packet segmentation and reassembly. The description was nevertheless done in order to present a consistent vocabulary for the description of the high-speed memory design itself that follows.

High-speed Memory Design

Briefly recapitulated, the purpose of the high-speed memory 116 is to receive and buffer segmented packets 212 from the switch fabric 102, and send them to the egress packet processor 118 as required.

Figure 5:
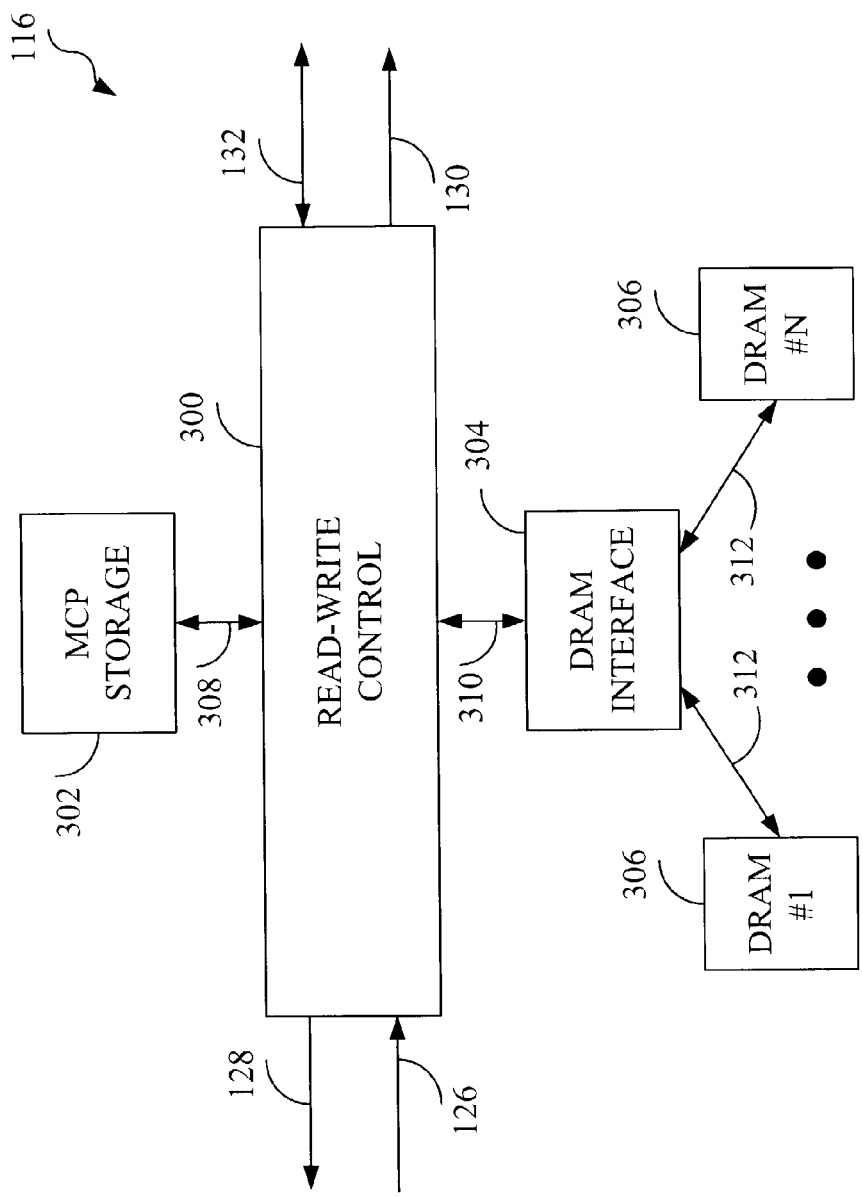
FIG. 5 is a high-level block diagram of the high-speed memory of the embodiment of the invention.

FIG. 5 illustrates a high-level block diagram of the high-speed memory 116.

The high-speed memory 116 comprises a read-write control 300, an MCP (multi-cell pointer) storage 302, a DRAM interface 304, and a number N of DRAM memory modules 306 (DRAM #1 to DRAM #N).

The read-write control 300 communicates with the switch fabric interface 114 (FIG. 3) over links 126 and 128, and with the egress packet processor 118 (FIG. 3) over links 130 and 132.

The read-write control 300 is connected with the MCP storage 302 over a bus 308, and with the DRAM interface 304 over a bus 310. The N DRAM modules 306 are connected to the DRAM interface 304 over N individual busses 312.

The function of the DRAM interface 304 is merely to multiplex/demultiplex the bus 310 into separate busses 312.

Figure 6:
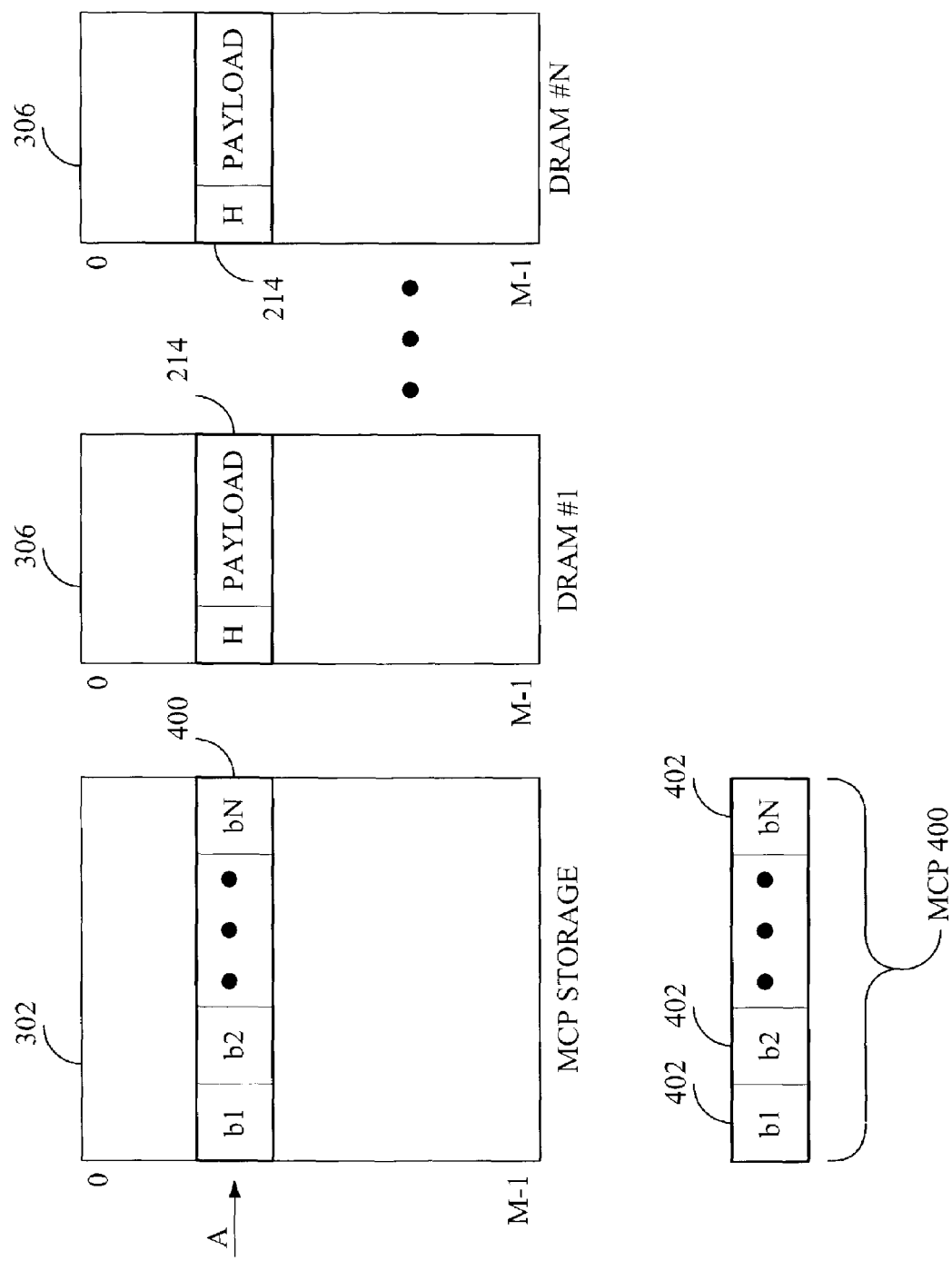
FIG. 6 is an illustration of the memory organization of the (multi-cell pointer) MCP storage and of the DRAM memory modules used in the high-speed memory of FIG. 5, including the MCP format.

In FIG. 6 is illustrated the memory organization of the MCP storage 302 and of the DRAM modules 306. Also illustrated in FIG. 6 is an exemplary format of a multi-cell pointer (MCP) 400.

The multi-cell pointer (MCP) 400 comprises N DRAM order fields 402 (b1 to bN).

The MCP storage 302 provides memory for the storage of a number M of MCPs 400 at the addresses 0 to M−1.

Each single DRAM module 306 provides memory for the storage of the same number M of switch cells 214. The high-speed memory 116 as a whole thus provides cell storage capacity of N multiplied by M switch cells 214.

Each group of (up to N) switch cells 214, stored at the same address A in the DRAMs #1 to #N, are part of the same segmented packet 212 (FIG. 3), but are not necessarily stored in the order 1 to N. The storage of the switch cells 214 that correspond to one complete segmented packet 212, is thus split into as many groups of N switch cells 214 as is necessary.

An associated MCP 400 stored at a group address A in the MCP storage 302, provides a module order reference to the up to N switch cells 214 stored at the same group address A in the DRAMs #1 to #N as follows:

A group of up to N sequential switch cells 214 (possibly out of a longer segmented packet containing more than N switch cells) is stored at the group address A, one switch cell per DRAM module. Also stored at the group address A in the MCP storage 302 is an associated MCP 400 containing the N DRAM order fields 402 labeled b1, b2, . . . bN. The value of b1 (ranging from 1 to N) indicates the DRAM module number in which the first switch cell 214 of the sequence is stored, b2 indicates the DRAM module number of the second switch cell of the sequence, and so on.

A value of zero stored in a DRAM order field 402 indicates that no cell is stored at this point of a sequence, allowing for the case where a group of switch cells 214 contains fewer than N cells. This case occurs whenever the number of switch cells 214 in a segmented packet 212 is not an integer multiple of N.

MCP Memory Organization in an Egress Packet Processor

Figure 7:
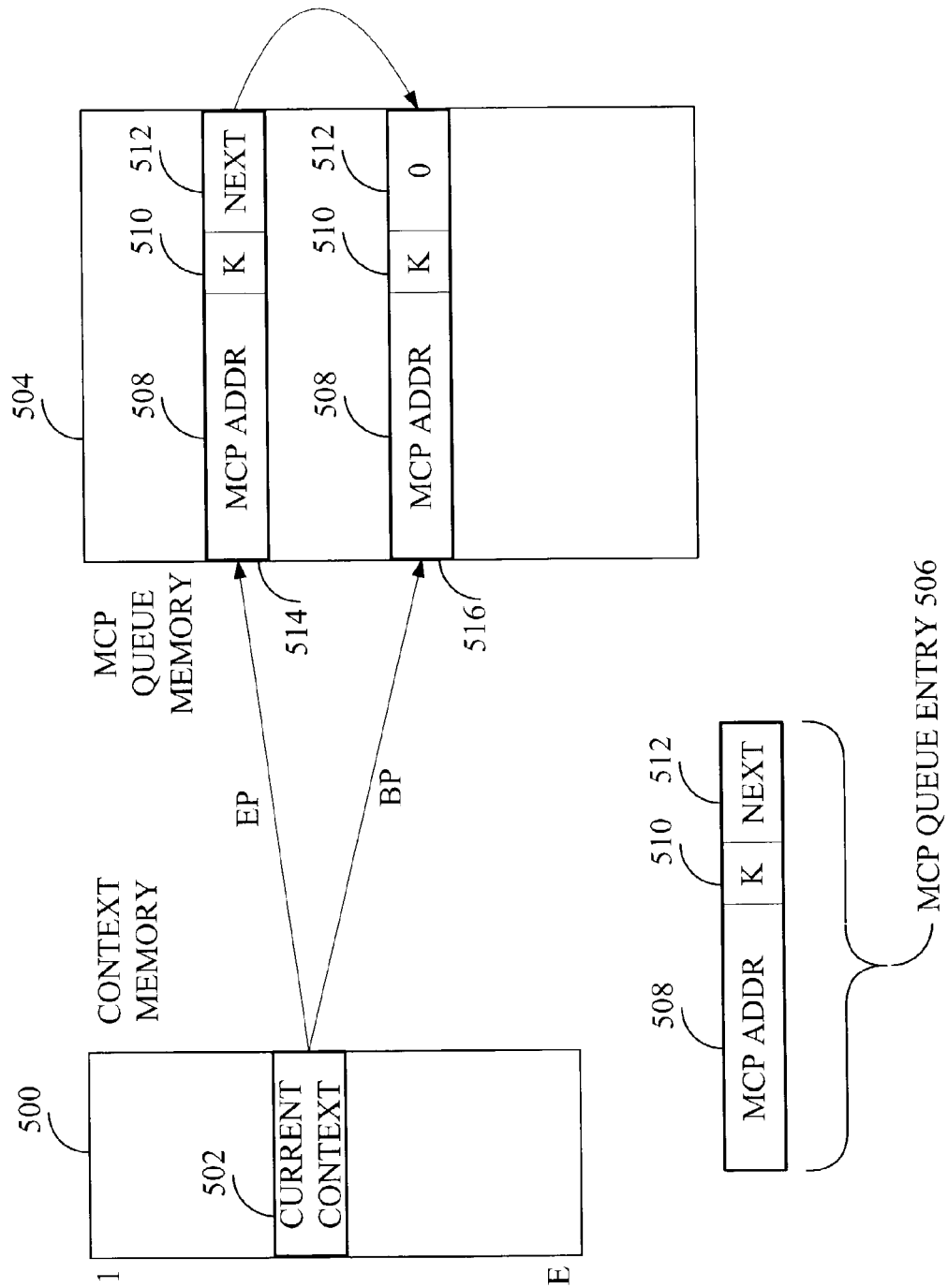
FIG. 7 is an illustration of exemplary MCP management structures in the egress packet processor used in the large packet switch of FIG. 3.

FIG. 7 illustrates exemplary MCP management structures in the egress packet processor 118 that are used to track the segmented packets 212 that are stored in a high-speed memory 116.

Shown are the following elements: a context memory 500 comprising E context entries 502; a MCP queue memory 504; and an exemplary format of a MCP queue entry 506. A field in the context entry 502 comprises pointers to a MCP queue entries 506 in the MCP queue memory 504. The fields of the MCP queue entry 506 are as follows; an MCP address 508; a counter field 510 (labeled K); and a next pointer field 512. Not shown are other context and queue related fields (such as tail pointers), which are readily understood by persons skilled in the art.

As shown in FIG. 7, an MCP queue is indexed by the current context 502 in the context memory 500, the begin pointer (BP) of the context entry 502 pointing to a first MCP queue entry 514 in the MCP queue memory 504. The NEXT field 512 of the first MCP queue entry 514 contains a pointer to a second MCP queue entry 516. If the queue were longer, the second MCP queue entry 516 would contain a pointer to a third MCP queue entry 506 and so on. But as the second MCP queue entry 516 is the last entry of the queue, it contains 0 in the NEXT field 512.

The end pointer (EP) of the context entry 502 points to the last MCP queue entry 516 in the MCP queue memory 504, defining the tail of the queue for the switch cells of all segmented packets 212 of switch cells 214 that are still in the queue of the indicated context.

An inactive context would have a context entry 502 of null in the context memory 500, i.e. not pointing to any MCP queue in the MCP queue memory 504.

The MCP address field 508 of a MCP queue entry 514 is the address A in the high-speed memory 116 where the referenced MCP 400 (in the MCP storage 302) is located. The MCP address field 508 is also the same address at which the up to N switch cells 214 are stored in the DRAM modules 306.

The counter field 510 of a MCP queue entry 514 indicates the number (1 to N) of valid DRAM order fields in the MCP referenced.

Read-write Control

Figure 8:
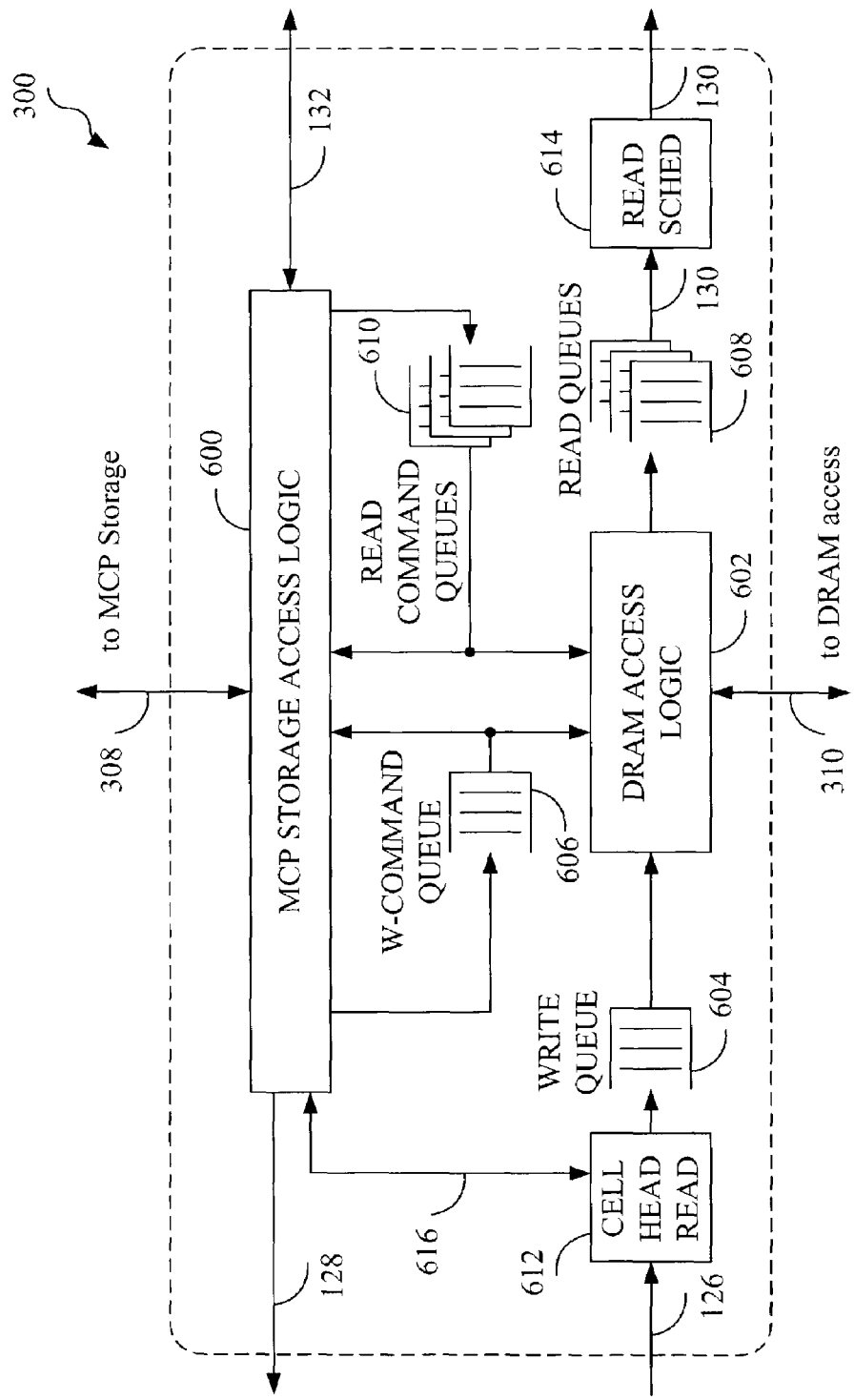
FIG. 8 is an illustration of the read-write control block of the high-speed memory of FIG. 5.

FIG. 8 illustrates the read-write control 300 of the high-speed memory 116.

The read-write control block 300 comprises control logic and queues to coordinate the storage and retrieval of switch cells 214.

The read-write control block 300 comprises of a MCP storage access logic 600, a DRAM access logic 602, a write queue 604, a write command queue 606, a set of read queues 608, a set of read command queues 610, a cell header read circuit 612, and a read queue scheduler 614.

The MCP storage access logic 600 is connected to the MCP storage 302 over bus 308 to the cell header read circuit 612 over a context data link 616; to the input and the output of the write command queue 606; to the input and the output of the set of read command queues 610; to the switch fabric interface 114 over the back pressure link 128; and to the egress processor 118 over the bi-directional control link 132.

The DRAM access logic 602 is connected to the DRAM interface 304 over the bus 310 to the input of the set of read queues 608, and to the outputs of the set of read command queues 610, of the write queue 604, and of the write command queue 606.

The cell header read circuit 612 is connected to the switch fabric interface 114 over the cell data link 126; to the MCP storage access logic 600 over the context data link 616; and to the input of the write queue 604.

The read queue scheduler 614 is connected to the outputs of the set of read queues 608, and to the egress packet processor 118 over the cell data link 130.

Every segmented packet 212 is comprised of cells 214 which belong to a context, indicated in the cell header, as has been described earlier.

When a switch cell 214 is received by the cell header read circuit 612, the cell header read circuit 612 forwards the context identifier from the cell header to the MCP storage access logic 600, which in turn forwards it to the egress packet processor 118. In the mean time, the cell is queued in the write queue 604.

As described below, a new memory address A may have to be obtained by the MCP storage access logic 600.

The MCP storage access logic 600 maintains a list of available memory addresses (usually referred to as a free list). Whenever a new memory address is needed it is obtained from the free list; when it is no longer needed, it is returned to the free list.

If a new memory address A cannot be obtained because the free list is empty, the MCP storage access logic 600 activates the backpressure link 128. Similarly, if the write queue 604 is almost full, the access logic 600 activates the backpressure link 128.

The activation of the backpressure link 128 results in no further cells being sent by the sources of cells in the switch fabric 102.

However, activation of the backpressure link 128 should be a rare event with normal traffic patterns.

The memory address A will be used to index the MCP storage 302 as well as the DRAM modules 306. As described earlier, a single address is used for storing up to N switch cells of the segmented packet 212.

If the received switch cell 214 is a head cell 202 (signifying a new segmented packet corresponding to a new packet), a new memory address A is obtained, regardless of whether the indicated context is active or not.

A new memory address A is also obtained if the current MCP queue entry 514 for the indicated context is full (counter field 510 contains the value N).

If the received switch cell is a head cell 202, the address A is reserved for the first N switch cells of the segmented packet 212 of which the received head cell is merely the first.

The high-speed packet memory algorithm (described below) determines which of the N DRAM modules will be used to store the switch cell 214. The module number of the selected DRAM module 306 is stored in the first DRAM order field (402) b1 of the MCP 400 that will be stored in the MCP storage 302 at address A.

When a second switch cell 214 of the same segmented packet 212 arrives, it is stored at the same address A, but in a different DRAM module 306 than the first cell. The MCP (stored in the MCP storage 302) at the address A is updated to contain the DRAM module number selected for the second switch cell 214 in the DRAM order field (402) b2 of the MCP 400.

If the same segmented packet 212 contains more than N switch cells 214, additional MCPs and DRAM storage locations are assigned. The number of addresses (and MCPs 400) required to store an entire segmented packet 212 is equal to the number of switch cells divided by N and rounded up. For example a 1500 byte IP data packet 200 may be segmented into a segmented packet of 26 switch cells. If N=5, a total of 6 MCPs would required, and 6 addresses assigned, to store the switch cells deriving from such an IP packet.

The egress packet processor 118 only needs to have an MCP queue with one reassembly queue entry for every high-speed memory address; that is, only one for every N switch cells. This is a significant reduction in reassembly queue memory requirements compared to the prior art in which a queue entry is required for each switch cell.

The purpose of the write queue 604 is to hold the switch cells while the selection of the address A and of the DRAM modules 306 is made.

The purpose of the write command queue 606 is to hold the current MCP 400 until the DRAM module number selection is made and the switch cell is accepted by the DRAM access logic 602.

The write queue 604 and the write command queue 606 operate in lockstep, and enable switch cell input (on link 126) and switch cell storage (over bus 310) to be pipelined and avoid delays, a technique that is common in high-speed designs.

After the selection has been made, the MCP in the MCP storage 302 is updated.

The DRAM access logic 602 is responsive to the MCP 400 from the head of the write command queue 606 to select an available DRAM module for storing the switch cell 214 at the head of the write queue 604. The selection algorithm is described in the section entitled "High-Speed Packet Memory Algorithm" below.

After the head cell 202 is received, a memory address A is allocated as described earlier, and the egress packet processor 118 adds the newly allocated MCP to the MCP queue for the indicated context. The new MCP will have a counter field 510 value of one.

When a neck cell 204 is received, the egress packet processor 118 is interrogated by the high-speed memory 116 with respect to the context indicated in the switch cell. Upon lookup in the MCP queue memory 504, the MCP queue entry 506 is retrieved and sent to the MCP storage access logic 600 over control link 132.

The MCP storage access logic 600 uses the information in the MCP queue entry 506 to retrieve the MCP 400 from the MCP store 302 and enqueue the MCP 400 in the write command queue 606 as described earlier. Also, the counter value 510 of the MCP queue entry 506 in the MCP queue memory 504 is updated.

After N switch cells 214 have been received for the same segmented packet 212, the MCP 400 is full, and a new MCP 400 is allocated by the MCP storage access logic 600 and enqueued by the egress packet processor 118.

After the tail cell 210 of a segmented packet 212 is received and stored, the corresponding (IP) data packet is completely available, distributed as one or more switch cells 214 in the DRAM modules 306. At this point, the egress packet processor 118 is ready to read the switch cells 214 from the high-speed memory 116, and process the packet and forward it to the line interface 110.

Egress Queues

Before detailing the read operation, it is necessary to briefly introduce the concept of the egress queues, as used in one embodiment of the invention. Separate egress queues are used when the port module serves multiple external links, possibly with multiple priorities on each link.

Consequently, each egress queue is scheduled according to some queue policy established in the egress packet processor 118, essentially in a known manner. For example, packets cannot be transmitted on an external link any faster than the bit rate of that link permits. Similarly, multiple priorities may exist, and packets of the higher priority must be sent first.

The flow of switch cells from the high-speed memory 116 to the egress packet processor 118 must satisfy the sum of all traffic, which is a much higher rate than the rate for a single external link. However, the capacity for buffering in the egress packet processor 118 is limited.

The high-speed memory 116 advantageously supports the multiple egress queue concept of the egress packet processor 118, by providing a pipelined system comprised of the read queues 608, read command queues 610, and the associated control logic in the read-write control 300. This permits, generally speaking, many switch cells to be requested and retrieved from the DRAM storage in parallel and re-ordered in separate queues, without stalling the flow of cells. In this way the read operation is not a single pipeline of requests and switch cell deliveries, but multiple pipelines are running in parallel. This takes advantage of the availability of the multiple DRAM modules.

Read Operation

The read operation of a segmented packet 212 is triggered when the tail cell 210 of the segmented packet has been received and stored; if a received segmented packet 212 consists of a single switch cell 214 which is both a head and a tail cell, the read operation is also triggered.

In general terms, the read queues 608 in the read-write control 300 of the high-speed memory 116 are mirrored and logically coupled to the packet egress queues in the egress packet processor 118. When a segmented packet 212, equivalent to a segmented variable length data packet (e.g. IP data packet 200) is stored in the high-speed memory 116, it needs to be moved into the corresponding egress queue in the egress packet processor 118 for reassembly into the single packet (e.g. IP data packet). However, it may not be necessary to make a complete copy of the (e.g. IP) packet in the egress packet processor 118. Only a small FIFO buffer needs to be provided for each egress queue if the high-speed memory 116 is able to supply switch cells on demand to each of the egress FIFO queues, to prevent underflow of the FIFOs.

This is achieved by the combination of operations performed in the egress packet processor 118 (based on the memory structures of FIG. 7), and in the high-speed memory 116, including operations performed in the MCP storage access logic 600 and the read queue scheduler 614.

When the egress packet processor 118 has determined that a packet is completely stored in the high-speed memory 116 (indicated by the storage of a tail cell 210), the head of the MCP queue (MCP queue entry 514 at the begin pointer BP in FIG. 7) is retrieved and sent as a read command to the MCP storage access control 600 over control link 132.

Figure 9:
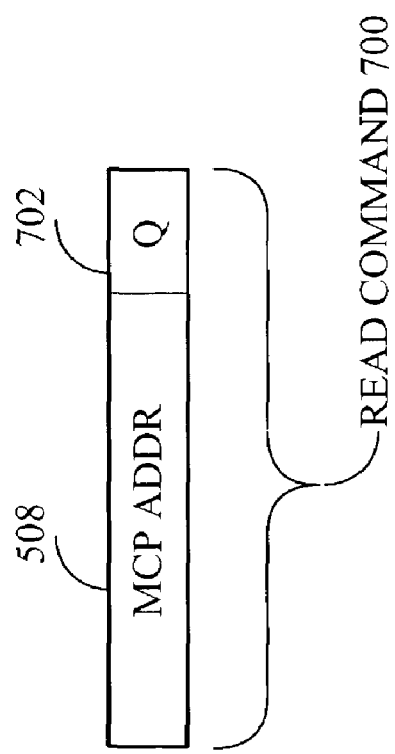
FIG. 9 is an illustration of the format of a read command used in the read-write control block of FIG. 8.

The format of a read command is illustrated in FIG. 9.

The read command 700 comprises an MCP address 508 from the MCP queue entry 516, and an indicator "Q" 702 indicating the egress queue identifier that is associated with the context of the current packet. Note that the number of egress queues may be less than the number of contexts E, but each context is associated with an egress queue.

The MCP storage access control 600 enqueues the read command 700 in the set of read command queues 610, specifically the read command queue indicated by "Q".

If the current packet contains more than N segments (switch cells), all MCP queue entries 506 are dequeued in the MCP queue memory of the egress packet processor 118 and sent to the high-speed memory 116 as read commands. Consequently, a series of read commands are enqueued in the specified read command queue 610, containing all information for retrieving all switch cells 214 from the DRAM modules 306.

The MCP address 508 of the read command 700 specifies the address A in the DRAM modules 306 from which switch cells 214 are to be read, as well as the (same) address A in the MCP storage 302 where the corresponding MCP 400 is stored. The DRAM order fields b1 to bN (402) of the MCP 400 indicate the order in which the switch cells are to be retrieved from the DRAM modules 306. The counter value "K" is determined from the number of valid fields b1 to bN 402 in the MCP entity 400. Each read command queue 610 is logically associated with a read queue 608 and a read queue manager. The read queue manager of each read queue 608 is responsible for issuing DRAM read requests to the DRAM access logic 602, resulting in switch cells 214 being read from selected DRAM modules 306 and placed into the logically associated read queue 608.

Figure 10:
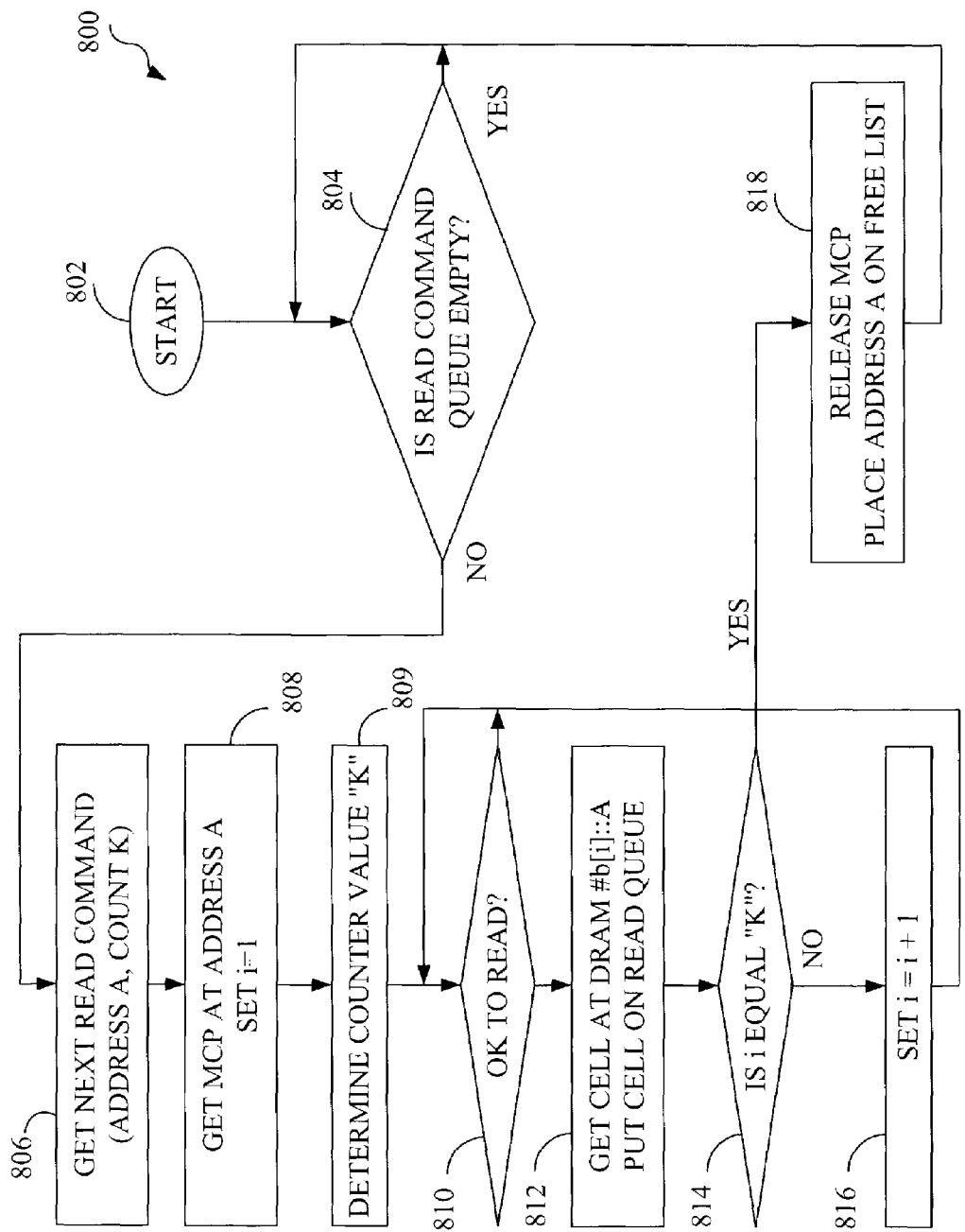
FIG. 10 is a logic flow chart of the read operation of the high-speed memory of FIG. 5.

A logic flow chart 800 of the read queue manager of a high-speed memory 116 is illustrated in FIG. 10.

The flow chart 800 is comprised of the following steps:
step 802, start;
step 804, a decision "Is read command queue empty?";
step 806, an action "Get next read command (address A)";
step 808, an action "Get MCP at address A, set i=1";
step 809 Determine the number of cells to read (the counter value "K").
step 810, a decision "OK to read?";
step 812, an action "Get cell at DRAM #[i]::A, put cell on read queue";
step 814, a decision "Is i equal K?";
step 816, an action "Set i=i+1"; and
step 818, an action "Release MCP, place address A on free list".

The execution starts at the step 802, leading to the decision step 804. The "yes" output of the decision box leads to the step 806; the "no" output leads back to the input of the step 804. The purpose of the step 804 is to wait until the read command queue is not empty.

The execution from the output of the step 806 continues through the step 808 to the decision step 810. The functions of the steps 806 and 808 are to remove a read command 700 from the read command queue 610, obtain an MCP 400 from the MCP storage 302 using the address from the read command 700, and set up a loop counter "i".

The steps 810, 812, 814, and 816 contain a loop, for looping over the b[i] fields of the MCP 400.

In the decision step 810, a number of conditions are tested to determine if it is "OK to read". Execution cycles back to the step 810 until the conditions are met. The conditions include a test whether there is sufficient space in the read queue 608 for receiving the switch cell 214 that is about to be read. The conditions further include a test whether the DRAM module to be read is available for reading (i.e. that there is not already a read or write operation pending on it, reported by the DRAM access logic 602).

If the conditions of step 810 "OK to read?" are met (output "Yes"), a read request is issued to the DRAM access logic 602, as shown in the step 812. The specific DRAM module number is obtained from the ith DRAM order field b[i] 402 from the MCP 400, the DRAM address A is the address in the read command 700.

The step 812 includes the action of the DRAM access logic 602 that reads the cell from the DRAM module 306 specified and places the cell on the read queue 608 that is associated with the read queue manager. The duration of the step 812 is determined by the access speed of the DRAM module 306. For the duration of this step, the selected DRAM module is not accessible by other read queues 608 or the write queue 604.

It is noted that each read queue/read command queue pair has its own read queue manager, and all read queue managers operate independently and concurrently. The DRAM access logic 602 arbitrates the read requests of all read queue managers, as well as the write queue 604, to allow access to each DRAM module 306 by only one queue at a time.

A significant advantage is obtained by the aforementioned aspect of the invention. Since there are multiple read queues, as well as multiple DRAM modules, the available access bandwidth of the DRAM modules can be fully utilized when there is a high amount of traffic:
  switch cells 214 are placed into DRAM modules 306 by the write queue 604 which has priority and will always obtain a storage cycle when a switch cell 214 is available to be written;
  a series of read commands is generated as soon as a completed packet (a segmented packet 212) has been placed in the DRAM modules 306;
  the aggregate DRAM module access capacity is designed, through the choice of N, to be at least equal to the sum of the write bandwidth (access from the switch fabric interface 114) and the read bandwidth (access by the egress packet processor 118);
  each of the read queue managers waits for the earliest opportunity to read switch cells 214 and place them in the associated read queues 608;
  the read queue scheduler 614 continuously scans the outputs of the read queues 608 in a round robin cycle and outputs each switch cell 214 to the egress packet processor 118 via the cell data link 130, at the rate the egress packet processor 18 is accepting them (using a simple hand shake signal).

All packet switching systems must be prepared to handle normal and unusual traffic overload situations. The high-speed memory 116 of the present invention is very advantageously equipped to handle all traffic overload situations.

Normal traffic overload occurs when an excess amount of traffic temporarily arrives at one of the port modules 104 from the switch fabric 102. The high-speed memory 116 simply buffers this traffic, as the write operation has priority, and write access bandwidth to the high-speed memory 116 is sufficient to accept the full bandwidth from the switch fabric interface 114.

An unusual traffic overload situation can exist if the storage memory becomes completely filled. This can happen if there is a long period of excess amount of traffic arriving. In this case, the backpressure signal sent back to the switch fabric interface 114 (over the backpressure link 128) regulates the amount of traffic that will arrive; no packets are lost as the backpressure signal propagates to the upstream buffering stages in the system.

Another unusual traffic overload situation can exist if traffic to one of the external links 108 of one of the port modules 104 exceeds the bandwidth of the external link. In this case, the read queues 608 that correspond to the overloaded external link will be emptied (by the egress packet processor 118 through the read queue scheduler 614) only at the rate of the link. Since the read queues 608 have a limited capacity, the step 810 "OK to read?" in the read queue manager operation of the affected read queue 608 will wait, effectively causing the cells to accumulate in the DRAM modules 306. However, the egress packet processor 118 can recognize the situation and discard switch cells 214 of the lower priority read queue 608.

Opportunistic Treatment of Single Cell Packets

A received data packet may be very short and will be segmented into a single switch cell 214 (a single cell packet, or SCP). An SCP is stored in DRAM at the group address A, and an associated MCP 400 containing the DRAM order fields 402 is stored in MCP storage 302 at the group address A, in the manner described earlier.

It will be appreciated that an SCP occupies only one of a possible N DRAM locations at the group address A, and requires only the first of the N DRAM order fields 402 available in the associated MCP 400. In general, the N−1 DRAM locations at the group address A and the N−1 DRAM order fields 402 of the associated MCP 400 remain unused.

The waste of unused resources can be reduced if one or more additional packets are received, and can be stored in the unused DRAM locations. This is possible only if the next arriving data packets meet the following four conditions:
- the data packets are segmented as single cell packets;
- they are destined for the same egress queue as the first single cell packet;
- they arrive within a hold-over time H of the arrival of the first single cell packet, H being a number of cell times;
- H is equal or less than the number of DRAM modules N (H=3 cell times in the embodiment of the invention).

If these conditions are met, the H−1 or fewer additional switch cells 214 are stored in DRAM in exactly the same way as if they were from a single (longer) data packet that had been segmented into the group of H or fewer switch cells 214. In other words, what appears to have been stored in the high-speed memory 116 is a longer segmented data packet.

This mechanism allows up to H consecutive very short packets to be accumulated and treated as if they constituted a single longer packet, thus making better use of the DRAM and MCP resources.

Furthermore, even non-consecutive or interleaved single packets can be processed to share resources (MCP and group addresses), as the following example based on the embodiment of the invention, shows:

Assume a sequence of four consecutive single cell packets in which the first and third packets are destined for an egress queue Q1, and the second and fourth packets are destined for a different egress queue Q2. The first and third packets satisfy said four conditions and share one MCP at one group address. The second and fourth packets also satisfy said four conditions and share another MCP and another group address. Without the opportunistic treatment of single cell packets, four MCPs and four group addresses would have been required in this example.

High-speed Memory Write Operation

It has been described how the multi-cell pointer (MCP) storage 302 tracks the order in which DRAM modules 306 are assigned to sequentially store successive switch cells 214, as they arrive through the write queue 604.

Whenever a switch cell 214 arrives, a choice must be made as to which DRAM module 306 the switch cell 214 should be stored in. At the same time, in order not to cause the write queue 604 to overflow (invoking back pressure unnecessarily), it is important that arriving switch cells 214 be stored in a DRAM module 306 as expeditiously as possible.

On the other hand, the access of each individual DRAM module 306 takes more than one cell cycle (the basic rate at which cells are written or read): once a write or read operation is started on an individual DRAM module 306, it remains inaccessible for a number of cell cycles.

The DRAM access logic 602 keeps track of the utilization of the DRAM storage of each DRAM module 306.

Figure 11:
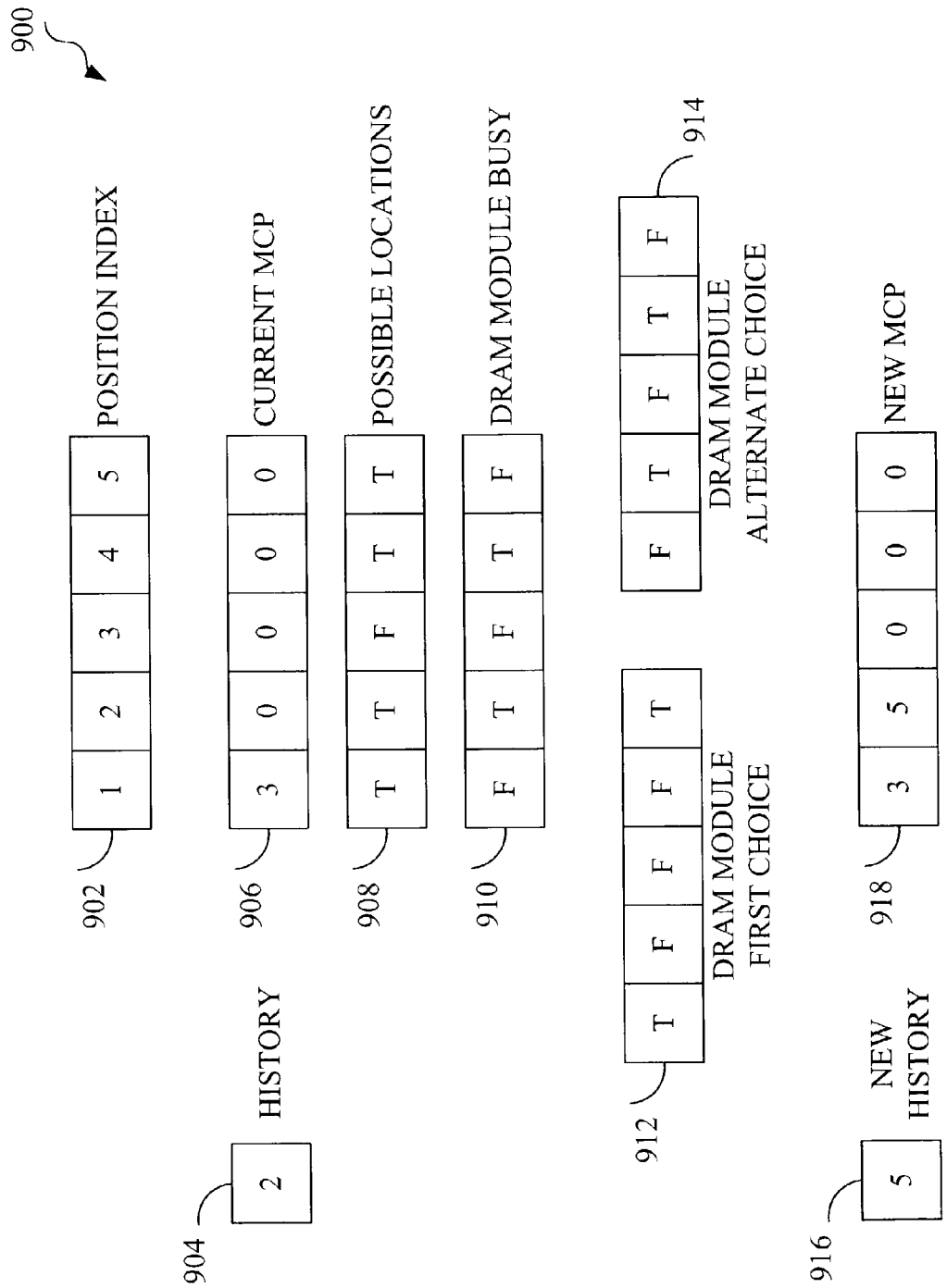
FIG. 11 is an illustration of registers used in the high-speed memory of FIG. 5 to perform the DRAM module number selection during a write operation.

FIG. 11 depicts a high-speed memory algorithm 900 to perform the DRAM module number selection during a write operation. The read operation merely retrieves the stored switch cells 214 in the sequence they were written in (interleaved by virtue of the multiple egress queue concurrency described above).

The high-speed memory algorithm 900 uses the natural randomness (in time) of arriving traffic, and is responsive to the status of the DRAM modules 306, in order to provide a method of DRAM module selection, which meets both the requirements, of even distribution and of expediency. This method is performed by high-speed logic circuits located in the MCP storage access logic 600 and the DRAM access logic 602.

FIG. 11 shows a number of registers, some containing numeric values, others containing logical flags. The numeric values range from 0 to N, N=5 for the purpose of the illustration, and indicate DRAM module numbers (1 to N) or empty (0). The logical flag registers contain the values of T (true) and F (false).

The registers are as follows:
- a position index register 902;
- a history register 904;
- a current MCP register 906;
- a possible locations register 908;
- a DRAM module busy register 910;
- a DRAM module first choice register 912;
- a DRAM module alternate choice register 914;
- a (new) history register 916; and
- a (new) MCP history 918.

The position index register 902 contains the position index of all N (N=5) DRAM modules, equating the DRAM module number with the position in the register 902. This register remains constant throughout the operation of the algorithm.

The history register 904 contains the DRAM number of the previous write operation. The object of the previous write operation (a switch cell 214 belonging to a context) is generally unrelated to the current write operation, especially so in the case of high traffic intensity since it is unlikely that two successively arriving switch cells 214 are from the same context.

The current MCP register 906 contains the current MCP 400 of the current write operation. The current MCP 400 is either a fresh MCP, obtained from the free list, or is an MCP already enqueued in the MCP queue memory 504 of the egress packet processor. In the latter case, the actual MCP 400 is obtained by reading the MCP storage 302 at the MCP address 508 given in the MCP queue entry 514. The current MCP register 906 in FIG. 11 shows the case of an MCP 400 already filled with one DRAM order field 402, with the value 3. This means that the last switch cell 214 of this context (and thus of the same segmented packet 212) was stored in DRAM module #3.

The possible locations register 908 is a flag register, indicating as true (T) all DRAM module positions that are still available for the current MCP. Given that DRAM module #3 was already used (see current MCP register 906),

3 is unavailable (possible locations register 908, field #3=F=false), all other DRAM module numbers are available (T=true) in this example.

The DRAM module busy register 910 indicates by true (T) or false (F) all DRAM modules that are currently engaged in a (previously initiated) read or write operation that is not yet finished. In the example, DRAM modules #2 and #4 are shown to be busy.

The DRAM module first choice register 912 is a flag register, based on the fill status of the DRAM modules 306. The register contains the value true (T) for all DRAM module positions which refer to DRAM modules 306 with below a threshold fill level, and which are also available considering the possible locations register 908. In the example, DRAM module positions #1 and #5 are shown as available in the DRAM module first choice register 912.

The DRAM module alternate choice register 914 is a flag register, showing the inverse values of the DRAM module first choice register 912, conditioned with the contents of the possible locations register 908. In other words, the DRAM module alternate choice register 914 indicates true (T) for all DRAM module positions which refer to DRAM modules 306 with at-or-above threshold fill, and which are also available considering the possible locations register 908.

In selecting a DRAM module 306 for the current write operation, the following steps are performed:
- if the DRAM module first choice register 912 contains any T field, a DRAM module position is selected from this register by scanning from the position indicated by the history register 904 (position 2 in the example) to the right (wrapping as necessary) until a position marked true (T) is found in the DRAM module first choice register 912. In the example this is position #5;
- if the DRAM module first choice register 912 does not contain any T field, the DRAM module alternate choice register 914 is used instead, in the same manner;
- the selection (#5 in the example) is entered into the (new) history register 916, replacing the previous value in the history register 904; and
- the selection (#5 in the example) is entered into the next empty (0) position of the current MCP register 906, creating the (new) MCP register 918.

The updated (new) MCP register 918 is written back into the MCP storage 302.

In an enhancement of the high-speed memory 116 of FIG. 5, a number S of additional DRAM modules may be provided as spare DRAM modules 306. In the high-speed memory algorithm 900 of FIG. 11, the position index register 902 then contains the module numbers of the N active DRAM modules, ranging in value from 1 to N+S. The DRAM module order fields b[i] 402 of the MCP 400 then automatically select the active DRAM modules, and the high-speed memory algorithm 900 of FIG. 11 automatically operates with only the active DRAM module numbers.

In a modification to the described embodiment, the port module 104 may comprise a local switch fabric and a plurality of any or each of, egress packet processors 112, egress packet processors 118, and high-speed packet memories 116, in order to support a greater number of external links 108.

In a further modification to the described embodiment, the port module 104 may comprise a plurality of switch interfaces (renamed mesh ports), connecting the port module directly to other port modules through an interface mesh, wherein the high-speed memory is connected to one or more mesh ports instead of a fabric interface.

In one more modification to the described embodiment, the read-write control block 300 may comprise a re-order buffer to allow simultaneous reading of cells from N DRAM modules to speed up the read operation from the N DRAM modules instead of the sequential reading described in the embodiment.

Although in the embodiment of the invention, the cells belonging to the same group of cells are stored in the same memory address in N memory modules (at the group address), it is understood that cells belonging to the same group may be stored at memory addresses which are selected from a sub-set of N memory addresses, the addresses in the sub-set being related among the N memory modules according to a first relationship (e.g. shifted by a predetermined number). It is also understood that the MCP for the group of cells may be stored in the MCP storage at another address which is related to one of the memory addresses in the sub-set of N memory addresses according to a second relationship, e.g. shifted by one.

Many other enhancements and variations within the scope of the invention will be readily apparent to persons skilled in the art, and are encompassed in the claims which follow.

What is claimed is:

1. A high-speed memory having a write port and a read port, comprising:
   N memory modules, N>1, each of the said N memory modules having M memory addresses for storing fixed size cells which are grouped into one or more groups of cells destined for the same port of an external device using the high-speed memory, each group including up to N cells;
   a read-write control block for receiving cells from the write port and storing each cell, which belongs to the same group, in a selected different one of the N memory modules at a memory address, the memory address being selected for each different one of the N memory modules from said M memory addresses according to a first relationship, and for retrieving each of said cells from the memory modules and sending said cells to the read port;
   a multi-cell pointer (MCP) storage for storing an MCP for each group of cells, each MCP having N memory module identifiers to record the order in which said cells of said each group are stored in each of the selected different one of the N memory modules; and
   the MCP being stored in the MCP storage at an MCP storage address, which is related to one of the memory addresses that have been selected according to the first relationship, according to a second relationship, wherein the cells are segments of a variable size packet divided into X cells, the packet including ⌈X/N⌉ groups of cells.

2. A high-speed memory as described in claim 1, wherein X=1 and N>1.

3. A high-speed memory as described in claim 2, wherein the group includes one or more single cell packets.

4. A high-speed memory as described in claim 3, wherein the group including more than one single cell packet includes packets arriving at the write port within a predetermined time interval.

5. A high-speed memory as described in claim 1, wherein the read-write control block comprises a means for retrieving each of said cells from said group of cells from the N memory modules and sending said cells to the read poll.

6. A high-speed memory as described in claim 5, wherein the read-write control block further comprises an MCP storage access logic block for retrieving and storing MCPs, and a memory module access logic block for providing read and write access to the N memory modules.

7. A high-speed memory as described in claim 6, wherein the MCP storage access logic comprises means for selecting one of the N memory modules for storing a cell arriving at the write port.

8. A high-speed memory as described in claim 5, wherein the means for retrieving includes a means for receiving read commands from the read port, and a read queue means for queuing the retrieved cells.

9. A high-speed memory as described in claim 8, wherein the means for retrieving further comprises a scheduler for retrieving the cells from a plurality of the read queue means and sending the cells to the read port.

10. A high-speed memory as described in claim 5, wherein the means for retrieving comprises a means for receiving and storing comprising a means for reading cell information, write queue means for queuing the cells to be stored in the N memory modules.

11. A high-speed memory as described in claim 5, wherein the means for retrieving provides retrieval of said cells of said group of cells from the N memory modules in the order recorded by the associated MCP.

12. In combination, a high-speed memory as described in claim 1, and a packet processor for processing variable size packets buffered in the high-speed memory.

13. A high-speed memory as described in claim 1, wherein the read-write control block further comprises means for monitoring the number of cells presently stored in the N memory modules and for generating a backpres sure control signal when the number of cells exceeds a threshold.

14. A packet switch, comprising a plurality of port interfaces associated with packet processing means and connected to a packet memory, the packet memory being the high-speed memory as described in claim 1.

15. A packet switch, comprising a plurality of port modules, each comprising a packet processing means and a packet memory, the packet memory being the high-speed memory as described in claim 1, the plurality of port modules being interconnected.

16. A packet switch as described in claim 15, wherein the plurality of port modules is interconnected though a switch fabric.

17. A packet switch as described in claim 15, wherein each of the plurality of port modules comprises multiple ports to provide a mesh interconnection between the port modules.

18. A high-speed memory as described in claim 1, wherein cells from a variable size packet are assigned to ⌈X/N⌉ groups of cells sequentially.

19. A high-speed memory as described in claim 1, wherein the first relationship is such that each of the memory addresses that have been selected according to the first relationship is the same.

20. A high-speed memory as described in claim 19, wherein the second relationship is such that the MCP address is the same as each of the memory addresses that have been selected according to the first relationship.

21. A high-speed memory as described in claim 20, wherein N=5.

22. A high-speed memory as described in claim 20, wherein X ranges from X=1 to 200.

23. A packet switch, comprising a plurality of port modules, each comprising a packet processing means and a packet memory, the packet memory being the high-speed memory as described in claim 20, the plurality of port modules being interconnected.

24. A packet switch as described in claim 23, wherein the plurality of port modules being interconnected though a switch fabric.

25. A packet switch as described in claim 23, wherein each of the plurality of port modules comprises multiple ports to provide a mesh interconnection between the port modules.

26. A high-speed memory as described in claim 1, further comprising a memory interface between the read-write control block and the N memory modules.

27. A high-speed memory having a write port and a read port, comprising:
   N memory modules, N>1, for storing fixed size cells, which are segments of a variable size packet divided into X cells, the X cells being grouped into ⌈X/N⌉ groups of cells;
   a read-write control block comprising a means for receiving cells from the write port and storing each cell, which belongs to the same group, in a selected different one of the N memory modules at the same memory address to be referred to as a group address;
   a multi-cell pointer (MCP) storage for storing an MCP for said group of cells at an MCP address, the MCP having N memory module identifiers to record the order in which cells of said group of cells are stored in the N memory modules; and
   the MCP address being the same as the group address.

28. A high-speed memory as described in claim 27, wherein the read-write control block comprises means for retrieving each of said cells from said group of cells from the memory modules and sending said cells to the read port when all cells of the variable size packet have been stored.

29. A high-speed memory as described in claim 28, wherein the read-write control block further comprises an MCP storage access logic block for retrieving and storing MCPs, and a memory module access logic block (602) for providing read and write access to the N memory modules.

30. A high-speed memory as described in claim 29, wherein the MCP storage access logic comprises means for selecting one of the N memory modules for storing a cell arriving at the write port.

31. A high-speed memory as described in claim 28, wherein the means for retrieving includes a means for receiving read commands from the read port, and a read queue means for queuing the retrieved cells.

32. A high-speed memory as described in claim 31, wherein the means for retrieving further comprises a scheduler for retrieving the cells from a plurality of the read queue means and sending the cells to the read port.

33. A high-speed memory as described in claim 28, wherein the means for receiving cells from the write port and storing each cell comprises means for reading cell information, and write queue means for queuing the cells to be stored in the memory modules.

34. A high-speed memory as described in claim 28, wherein the means for retrieving provides retrieval of said cells of said group of cells from the N memory modules in the order recorded by the associated MCP.

35. A combination of a high-speed memory as described in claim 27, and a packet processor for processing variable size packets buffered in the high-speed memory.

36. A high-speed memory as described in claim 27 wherein the read-write control block further comprises means for monitoring the number of cells presently stored in the N memory modules and for generating a backpres sure control signal when the number of cells exceeds a threshold.

37. A packet switch, comprising a plurality of port interfaces associated with packet processing means and connected to a packet memory, the packet memory being the high-speed memory as described in claim 27.

38. A high-speed memory as described in claim 27, wherein cells from the variable size packet are assigned to the ⌈X/N⌉ groups of cells sequentially.

39. A high-speed memory as described in claim 27, wherein a first relationship is such that each memory address of the group address is the same.

40. A high-speed memory as described in claim 39, wherein a second relationship is such that the MCP address is the same as each of the memory addresses of the group address.

41. A high-speed memory as described in claim 40, wherein N=5.

42. A high-speed memory as described in claim 40, wherein X ranges from X=1 to 200.

43. A high-speed memory as described in claim 27, further comprising a memory interface between the read-write control block and the N memory modules.

44. A method for storing a cell in the high-speed memory of claim 27, comprising the steps of:
   (a) if the cell is a first cell in a group of cells:
      obtaining an unused group address;
      creating an associated MCP for said group of cells;
      storing the cell in one of the N memory modules at the group address;
      storing a memory module identifier of said one of the N memory modules in the associated MCP for said group of cells; and
      storing the associated MCP for said group of cells in the MCP storage;
   (b) if the cell is not a first cell in a group of cells:
      retrieving the associated MCP for said group of cells from the MCP storage;
      storing the cell in another one of the N memory modules at the group address;
      storing a memory module identifier of said another one of the N memory modules in the associated MCP for said group of cells; and
      storing the associated MCP for said group of cells in the MCP storage.

45. A method for storing and retrieving a variable size packet in a memory having N memory modules, comprising the steps of:
   (a) dividing the variable size packet into X fixed size cells;
   (b) grouping the X cells into ⌈X/N⌉ groups of cells;
   (c) storing each cell, which belongs to the same group of cells, in a selected different one of the N memory modules at the same memory address to be referred to as a group address;
   (d) creating a multi-cell pointer (MCP) having N memory module identifiers, the N memory module identifiers being recorded in the order in which the cells of the same group are stored in the N memory modules;
   (e) storing the MCP in an MCP storage at an MCP address, the MCP address being the same as the group address; and
   (f) repeating the steps (c) to (e) if required.

46. A method as described in claim 45, further comprising the step of retrieving the cells representing the variable size packet when all cells of the variable size packet have been stored.

47. A method as described in claim 46, wherein the step of retrieving comprises:
   (g) retrieving the MCP at the MCP address of the associated group of cells;
   (h) retrieving a cell at the group address from the memory module indicated by the memory module identifier of the MCP;
   (i) sending the cell to a read queue to be forwarded to a read port; and
   (j) repeating the steps (g) to (i) until all cell of the variable size packet have been retrieved.

48. A method as described in claim 45, wherein the step (c) comprises the steps of selecting the one of the N memory modules by taking into account the following criteria:
   the number of cells already stored in each of N available memory modules; and
   the memory module identifier of the memory module most recently used for storing a cell.

49. A method for storing and retrieving a sequence of single cell packets in a memory having N memory modules, comprising the steps of:
   (a) accumulating the packets having the same destination identifiers into groups of up to N cells;
   (b) storing each cell, which belongs to the same group of cells, in a selected different one of the N memory modules at the same memory address to be referred to as a group address;
   (c) creating a multi-cell pointer (MCP) having N memory module identifiers, the N memory module identifiers being recorded in the order in which the cells of the same group are stored in the N memory modules;
   (d) storing the MCP in an MCP storage at an MCP address, the MCP address being the same as the group address; and
   (e) repeating the steps (a) to (d) if required.

* * * * *